United States Patent
Patil et al.

(10) Patent No.: US 8,959,523 B2
(45) Date of Patent: Feb. 17, 2015

(54) AUTOMATED VIRTUAL MACHINE PLACEMENT PLANNING USING DIFFERENT PLACEMENT SOLUTIONS AT DIFFERENT HIERARCHICAL TREE LEVELS

(75) Inventors: Priti P. Patil, Wakad (IN); Anindya Neogi, New Delhi (IN); Aritra Sen, New Delhi (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 13/434,961

(22) Filed: Mar. 30, 2012

(65) Prior Publication Data
US 2013/0263120 A1     Oct. 3, 2013

(51) Int. Cl.
*G06F 9/46* (2006.01)
*G06F 9/455* (2006.01)
*G06F 15/177* (2006.01)
*G06F 15/173* (2006.01)

(52) U.S. Cl.
USPC ............... 718/104; 718/1; 709/220; 709/221; 709/222; 709/226

(58) Field of Classification Search
None
See application file for complete search history.

(56) References Cited

U.S. PATENT DOCUMENTS

| | | | |
|---|---|---|---|
| 2007/0233698 A1* | 10/2007 | Sundar et al. | 707/10 |
| 2008/0295094 A1 | 11/2008 | Korupolu et al. | |
| 2009/0070771 A1 | 3/2009 | Yuyitung et al. | |
| 2010/0250744 A1 | 9/2010 | Hadad et al. | |
| 2011/0106922 A1* | 5/2011 | Bouillet et al. | 709/221 |
| 2011/0214005 A1 | 9/2011 | Biran et al. | |
| 2011/0214122 A1 | 9/2011 | Lublin et al. | |
| 2011/0225277 A1 | 9/2011 | Freimuth et al. | |

FOREIGN PATENT DOCUMENTS

WO     WO2011088261     7/2011

OTHER PUBLICATIONS

Wood et al., Memory Buddies: Exploiting Page Sharing for Smart Colocation in Virtualized Data Centers, VEE' 09, Mar. 11-13, 2009.
Kumar et al., "vManage: Loosely Coupled Platform and Virtualization Management in Data Centers," ICAC '09, Jun. 15-19, 2009.

(Continued)

*Primary Examiner* — Meng An
*Assistant Examiner* — Bing Zhao
(74) *Attorney, Agent, or Firm* — Diana L. Roberts; David H. Judson

(57) ABSTRACT

A virtual machine placement framework is described to enable a data center operator to develop a placement scheme to satisfy its particular constraints while simultaneously optimizing resource utilization. To generate a placement solution, the virtual machine placement problem is first characterized as a "bin packing" problem. The framework provides simple interface tools and processing modules, and a pluggable architecture for receiving placement algorithms. To generate a solution, an administrator creates an XML representation that abstracts physical entities (e.g., data center, subnet, rack, physical server, and the like) into a hierarchical tree of bins. The administrator also defines a set of "rules" that govern (direct) the placement of the virtual machines by placing constraints on the placement scheme. Using the hierarchical tree and the rules, the framework is executed to generate a placement as a solution to a bin packing problem, preferably on a layer-by-layer basis.

24 Claims, 14 Drawing Sheets

(56) References Cited

OTHER PUBLICATIONS

Mann et al., "VMFlow: Leveraging VM Mobility to Reduce Network Power Costs in Data Centers," RI 10013, Nov. 19, 2010.

Sen et al., "Cloudbridge: On Integrated Hardware-Software Consolidation," IFIP Performance 2011—29th International Symposium on Computer Performance, Modeling, Measurement and Evaluation, vol. 39 Issue 2, Sep. 2011.

Dasgupta et al., "Workload Management for Power Efficiency in Virtualized Data Centers," Communications of the ACM, vol. 54, No. 7, Jul. 2011.

Verma et al., "pMapper: Power and Migration Cost Aware Application Placement in Virtualized Systems," Proceedings of the 9th ACM/IFIP/USENIX International Conference on Middleware, 2008.

Korupolu et al., "Coupled Placement in Modern Data Centers," IEEE International Parallel and Distributed Processing Symposium (IPDPS) 2009.

"Energy-Aware Resource Allocation Heuristics for Efficient Management of Data Centers for Cloud Computing," Preprint submitted to Future Generation Computer Systems, Mar. 21, 2011.

Verma et al, "BrownMap: Enforcing Power Budget in Shared Data Centers," Lecture Notes in Computer Science, 2010, vol. 6452/2010, SpringerLink, Middleware 2010.

\* cited by examiner

RULE 1 :
PUT ALL GREEN VMs IN THE SAME SUBNET.
LEVEL = SUBNET

RULE 2 :
PUT ALL DARK GREEN VMs IN THE SAME RACK
LEVEL = RACK

RULE 3 :
PUT ALL RED VMs IN THE SAME DATA CENTER
LEVEL = DATA CENTER

RULE 4 :
DON'T MIX RED AND BLUE VMs.
LEVEL = DATA CENTER.

AUTOMATED VIRTUAL MACHINE PLACEMENT PLANNING USING DIFFERENT PLACEMENT SOLUTIONS AT DIFFERENT HIERARCHICAL TREE LEVELS

BACKGROUND OF THE INVENTION

1. Technical Field

This disclosure relates generally to planning and deploying of resource-consuming virtual entities, e.g., virtual machines, in computing environments, e.g., a data center or a "cloud" of distributed computing resources.

2. Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run networked applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Virtual machine "placement" is the process of distributing a set of virtual machines across multiple physical servers. Preferably, the distribution should satisfy a number of different constraints, namely, the computational requirements of each individual virtual machine (which involves "sizing" of a VM based on its current workload), the computational capacity of the physical machines (which involves, among other things, ensuring that data center SLA violations do not occur), and the utilization of one or more resources within the data center. Optimizing virtual machine placement reduces server and overall operational costs of the facility.

Managing the efficient placement of many virtual machines onto many host machines is a complicated task. A known approach to this problem is to delegate this task to an automated management server that monitors the infrastructure and automatically manipulates the placement as needed, e.g., by moving virtual machines between hosts, suspending/resuming virtual machines, and so forth. An alternative approach, which is described in U.S. Publication No. 2010/0250744, uses a directed graph-based modeling approach to generate a plan for changing a current placement of virtual machines into a given desired (target) placement.

A data center administrator can control the placement process to a certain extent by imposing constraints on the placement process. These constraints, however, are diverse and evolving, and this complicates the placement problem. Often, implementing new data center constraints requires creation of a new placement algorithm or re-formulation of an existing one.

While some of the known approaches do provide useful results, there remains a need to provide enhanced placement methods. This disclosure addresses this need in the art.

BRIEF SUMMARY

According to this disclosure, a virtual machine placement framework is described to enable a data center operator to develop a placement scheme to satisfy its particular constraints while simultaneously optimizing resource utilization.

To this end, a virtual machine placement problem is characterized as a "bin packing" problem. A virtual machine placement "framework" generates a placement solution for a data center using simple interface tools and processing modules, and a pluggable architecture for receiving placement algorithms. An administrator uses a configurator (e.g., an XML editor) to create a representation (e.g., an XML document) of the physical entities (e.g., data center, subnet, rack, physical server, and the like) that is then processed to abstract the details of such entities into a hierarchical tree representation. The hierarchy has a number of levels, and each node represents an abstract data bin (a container). Using the configurator and a simple formatting scheme, the administrator also defines a set of "rules" that govern (direct) the placement of the virtual machines by placing constraints on the placement scheme. The rules conform to a simple rules grammar or syntax. A rules engine in the framework applies the user-defined rules to generate a set of virtual machine groupings that embody the defined (or other system-imposed) constraints. The virtual machine groupings are stored in a rule output table. After building the hierarchical tree and the rule output table, the framework generates a placement as a solution to a bin packing problem, wherein each node in the tree represents a bin and selected data from the rule output table forms the "balls" that are then packed into the bin. Preferably, the bin packing problem is solved on a layer-by-layer basis, starting with a root node of the hierarchy and iterating down the tree. In this way, a particular bin packing solution algorithm may be used at a given layer of the analysis. The framework thus provides a pluggable approach by which each layer of the hierarchy may be addressed (planned) using an algorithm that is best (or, at least, better) suited for that layer, and that takes into consideration the virtual machine constraints imposed by the user or the system.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
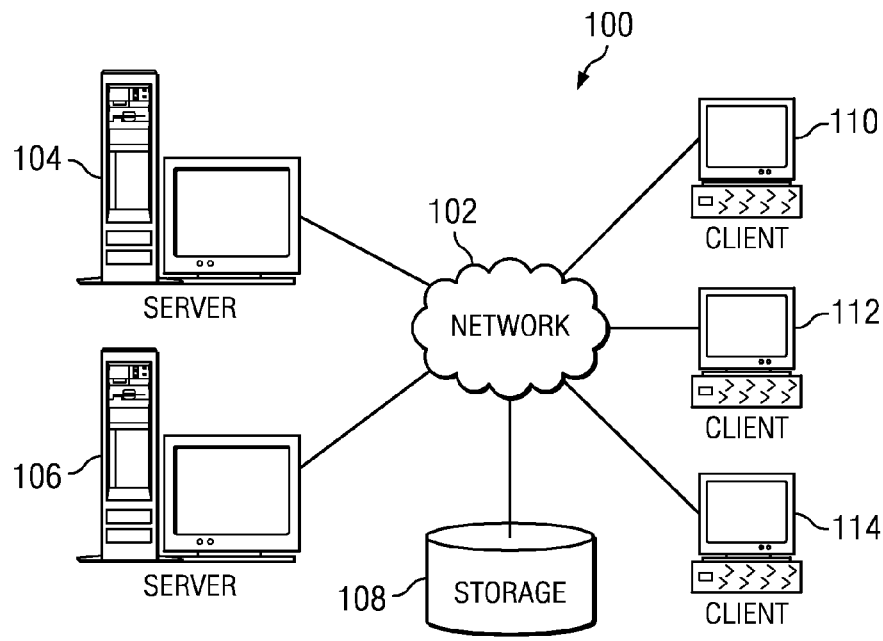
FIG. 1 depicts an exemplary block diagram of a distributed data processing environment in which exemplary aspects of the illustrative embodiments may be implemented.
Figure 2:
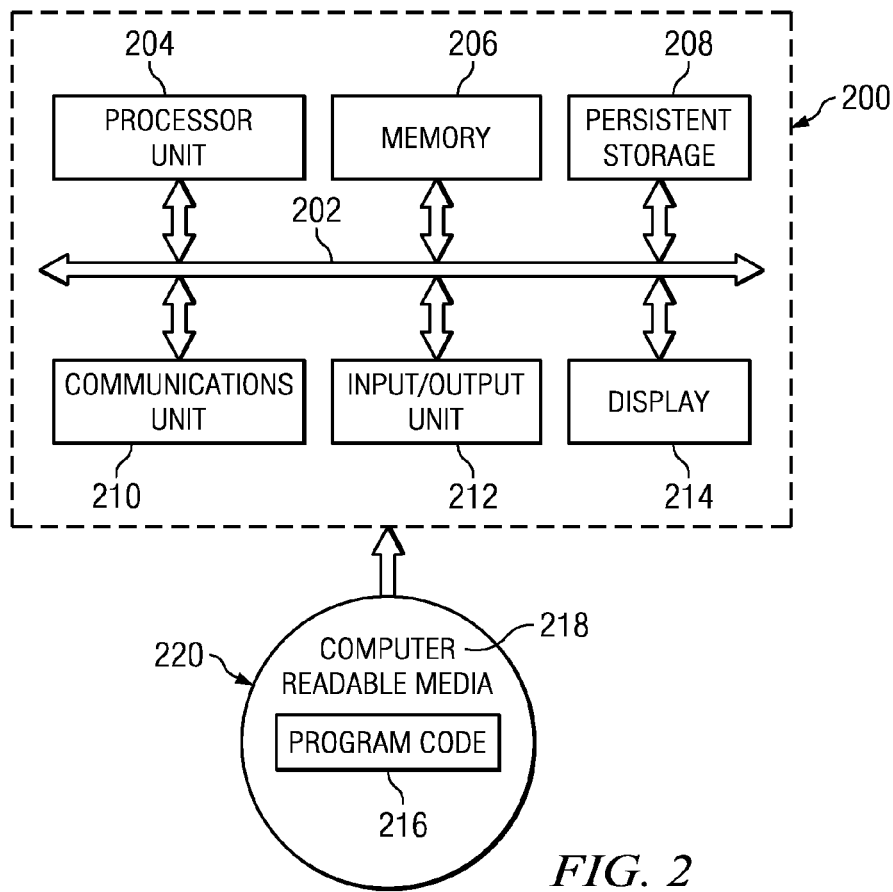
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
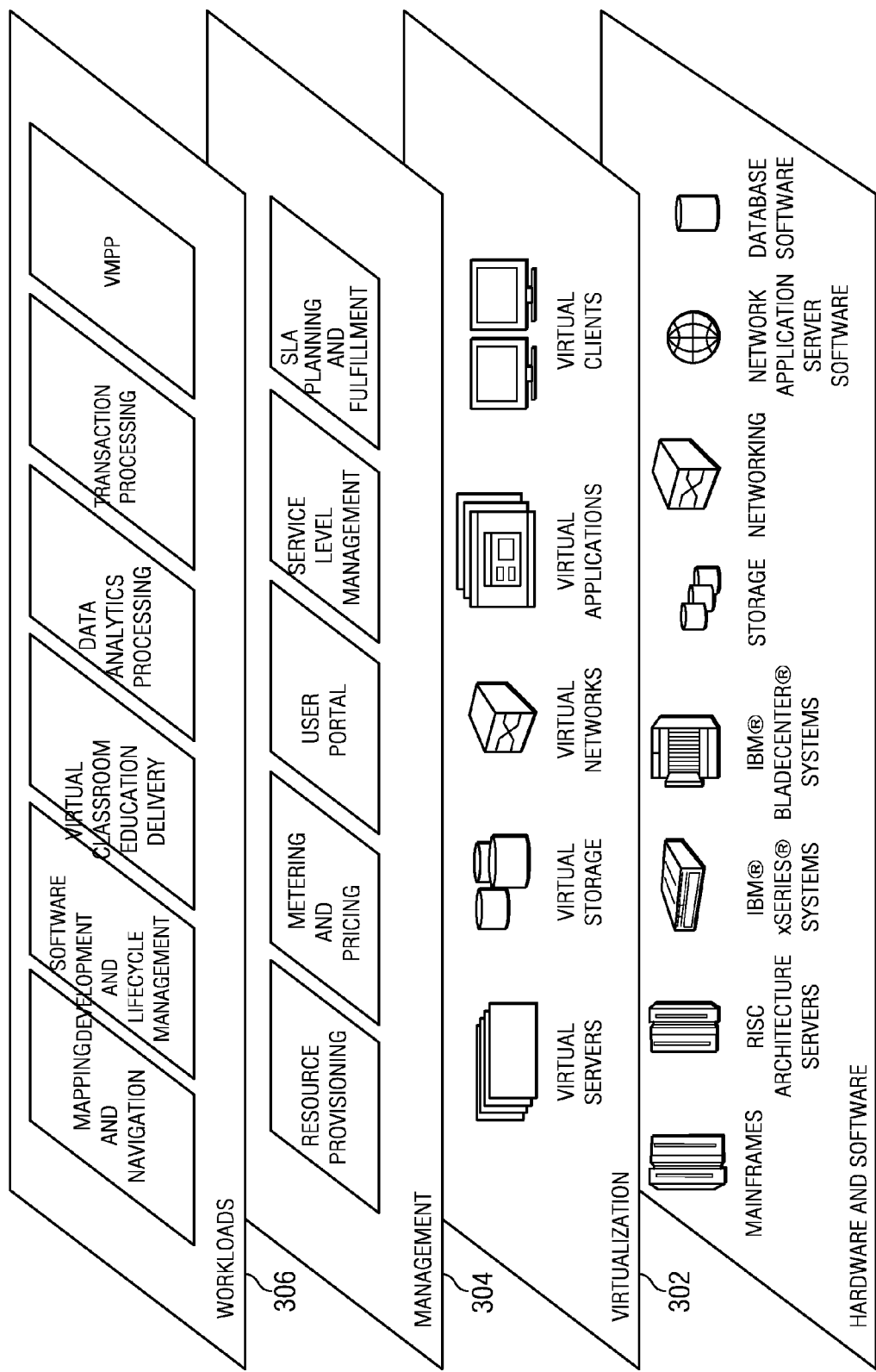
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and virtual machine placement planning (according to this disclosure).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Virtual Machine Placement Framework

Figure 4:
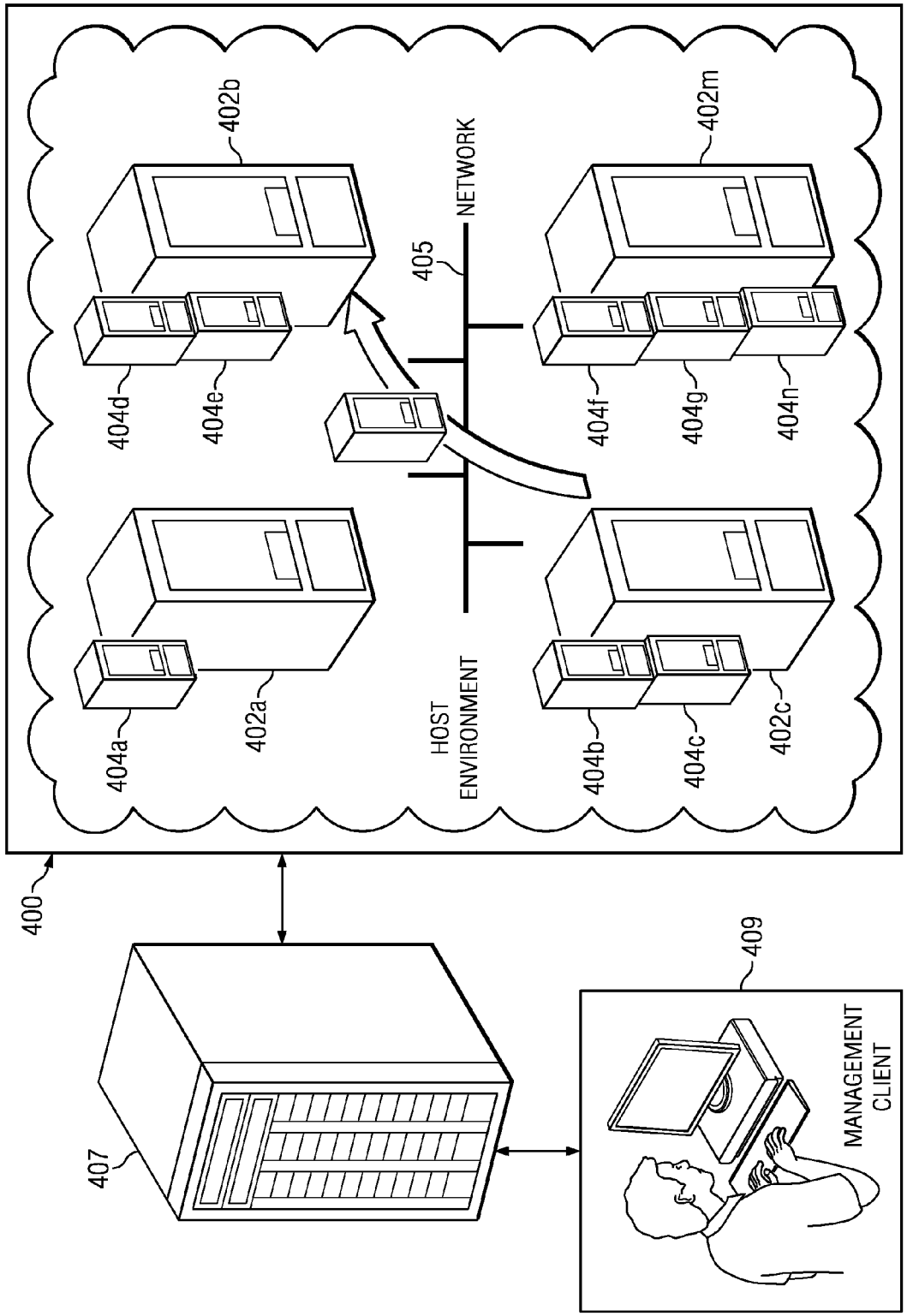
FIG. 4 illustrates an exemplary data center having an automated virtual machine planning functionality that may be enhanced according to the subject matter of this disclosure.

Automated virtual machine placement planning (VMPP) is the computation of a plan for changing the placement of virtual machines (VMs) onto host machines (HMs), e.g., from a "current" placement to a desired "target" placement. "Placement" of a VM onto a HM means that the VM is hosted at the HM and is assigned some or all of the HM resources. FIG. 4 depicts a diagram illustrating a computing environment in VMPP may be practiced In FIG. 4, an example virtual machine hosting environment 400 (alternately referred to herein as a data center or "cloud") is illustrated. This environment comprises host machines (HM) (e.g., servers or like physical machine computing devices) connected via a network 405 and a management server 407. As shown in FIG. 4, physical servers $402a \ldots 402m$, are each adapted to dynamically provide one or more virtual machines ($VM_1 \ldots VM_n$ denoted as $404a$ through $404n$, respectively) using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. The management server 407 may be connected to a client console 409, or to a global management system that manages larger-scale infrastructure (if the data center is being managed with other data centers). The management server 407 monitors the infrastructure and automatically manipulates the VM placement as needed, e.g., by moving virtual machines between hosts, suspending/resuming virtual machines, and the like.

With the above as background, the subject matter of this disclosure is now described. According to this disclosure, the virtual machine placement problem is characterized in a unique way and, in particular, as a "bin packing" problem. In the bin packing problem, objects of different volumes must be packed into a finite number of bins of fixed capacity in a way that minimizes the number of bins used. These objects may be conceptualized as "balls" that fill up the "bins."

To convert the virtual machine placement problem into a bin packing problem, the disclosed subject matter implements a virtual machine placement "framework." As will be described, the "framework" generates a placement solution for a data center using simple interface tools and processing modules, and a pluggable architecture for receiving placement algorithms. An administrator uses a configurator (e.g., an XML editor) to create a representation (e.g., an XML document) of the physical entities (e.g., data center, subnet, rack, physical server, and the like) that is then processed to abstract the details of such entities into a hierarchical tree representation. The hierarchy has a number of levels, and each node represents an abstract data bin (a container). Using the configurator and a simple formatting scheme, the administrator also defines a set of "rules" that govern (direct) the placement of the virtual machines by placing constraints on the placement scheme. The rules conform to a simple rules grammar or syntax. A rules engine in the framework applies the user-defined rules to generate a set of virtual machine groupings that embody the defined (or other system-imposed) constraints. The virtual machine groupings are stored in a database structure that is referred to as a "rule output table."

After building the hierarchical tree and the rule output table, the framework generates a placement as a solution to a bin packing problem, wherein each node in the tree represents a bin and selected data from the rule output table forms the "balls" that are then packed into the bin. Preferably, the bin packing problem is solved on a layer-by-layer basis, starting with a root node of the hierarchy and iterating down the tree. In this way, a particular bin packing solution algorithm may be used at a given layer of the analysis. The framework thus provides a pluggable approach by which each layer of the hierarchy may be addressed (planned) using an algorithm that is best (or, at least, better) suited for that layer, and that takes into consideration the virtual machine constraints imposed by the user or the system.

Figure 5:
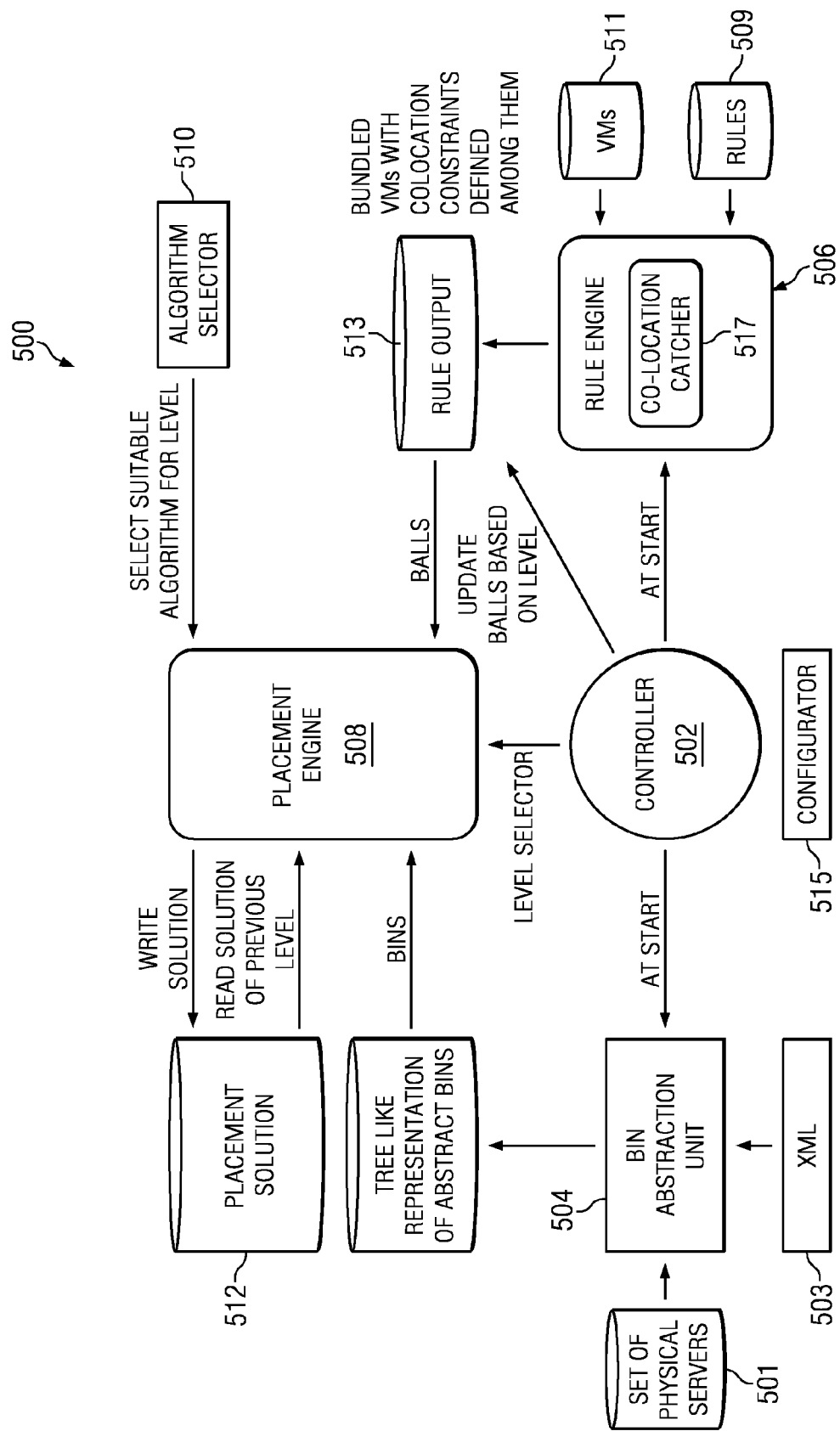
FIG. 5 illustrates a virtual machine planning framework according to this disclosure.

Referring now to FIG. 5, an overview is provided of the components of the virtual machine placement framework of this disclosure. The various components are illustrated for descriptive purposes. One or more of the components may be combined with one another, and components may be co-located or located remotely from one another. The framework or portions thereof may be operated as a service or otherwise available as a standalone product.

The framework 500 comprises controller 502, bin abstraction unit 504, rules engine 506, a placement engine 508, and an algorithm selector 510. The output of the framework (and, in particular, the placement engine 508) is a placement solution 512. The framework also includes (or is associated with) a number of databases, including database 501 that stores the properties of the physical servers, database 509 that stores a set of user-defined (or system-generated) rules (as will be described), and database 511 that stores the properties of the virtual machines. The placement solution may be updated periodically, or upon a given occurrence, such as a change in the data center. Typically, the framework is associated with a physical data center, although this is not a limitation, as the framework may be used to develop a virtual machine placement plan for multiple data centers that together comprise a facility. Although not meant to be limiting, typically a component of the framework is implemented as software, e.g., one or more computer programs, executable by one or more processors of a data processing system (such as shown above in FIG. 2). Several components have associated therewith one or more data stores for storing data used by the framework.

The controller 502 provides control over the framework components, initializing and executing the components as necessary. To that end, the controller 502 invokes the bin abstraction unit 504 and rules engine 506, typically upon initialization of the framework.

The framework also includes a configuration tool or configurator 515. The configurator may be web-based, and it provides a user (e.g., a data center administrator) with a set of interfaces (e.g., display screens) by which the user can generate an XML document 503 representing the data center topology, as well as a set of one or more rules that govern or direct the virtual machine placement by placing constraints on the placement scheme. These functions may be combined into a single tool, or they may be implemented separately. In one embodiment, the configurator comprises an XML editor to define the XML, and a rules editor to create the rules.

Preferably, the rules editor exposes a simple-to-use rules grammar or syntax that enables the user to define the rules using simple text entry or selection, fill-in fields, drop-down list functions, or the like. One or more template rules (or rule formats) are exposed to the user, who then completes the rule definition based on the constraints that the user desires to impose. Thus, in a representative embodiment, several rule formats may be as follows: "Put all VMs of [type] in the same [identified physical construct]," "Do not mix VMs of [type] and [type]," and the like. Other rule formats may be implemented using this basic formatting scheme, and the system may provide a set of default rules. The rules editor also may enable the user to define custom rule formats.

In general, and as noted above, the bin abstraction unit 504 operates to create a hierarchical tree model of the data center facility. The hierarchy forms layers (or "levels"), starting from a root. As will be seen, preferably each node of the hierarchical tree created by the bin abstraction unit is then viewed (by the placement engine 508) as a bin of a bin packing problem. Using the bin abstraction unit, the natural hierarchy in the facility (namely, data center, subnet, rack, physical server, and so forth) is extracted out (in the form of the hierarchical tree). As will be described below, this approach enables different placement algorithms to be applied at each layer of the hierarchy; this enables selection of an algorithm that is best (or, at least, better) suited for optimization of the placement at the particular layer.

In general, and as also noted above, the rules engine 506 uses a set of rules, where a rule defines a constraint on placement, together with information about the virtual machines to generate a rule output table 513, which is a database that may then be queried to obtain entities on which the rules are to be applied (by the placement engine 508). Using the bin metaphor, the entities may be viewed as "balls" of the bin packing problem. There may be one or more rules at each of the one or more levels of the hierarchical tree model. By using the rules engine, the framework takes into consideration any virtual machine constraints placed by the user.

Thus, according to this disclosure, the bin abstraction unit and the rules engine convert the placement problem into a layered bin packing problem. In the bin packing problem, and as noted above, objects of different volumes must be packed into a finite number of bins of fixed capacity in a way that minimizes the number of bins used. There are many known algorithms for solving the bin packing problem. They include, without limitation, best fit decreasing and first fit decreasing strategies, and other known algorithms. Representative algorithms include, without limitation, First-Fit, cMapper, and pMapper. The particular algorithms used herein to solve the bin packing problem at a particular layer are not a limitation of this disclosure, as any existing or later-developed algorithms may be used. Rather, the framework provides a convenient and simple way to "plug" any such algorithm into the placement solution generating mechanism.

Referring back to FIG. 5, once the controller invokes the bin abstractor and the rules engine to generate the "bins" and the "balls," the placement solution can then be computed. To this end, the controller 502 selects a level to be processed by the placement engine 508. Based on the selected level, there may be co-location constraints imposed on some of the bundled virtual machines; thus, the rule output table is updated as necessary. The algorithm selector 510 provides the controller 502 a particular algorithm for the level at which the placement solution is being generated. The placement engine then computes the placement solution for the level in question, preferably by reading a placement solution configuration from a prior level and then executing the selected placement algorithm against the prior level configuration, together with the "bin" and "ball" data. The result is a placement solution for the level. The steps are then iterated unless all levels have been solved. When all levels have been processed, a set of placement solutions have been generated, one per level of the hierarchy, wherein a particular placement solution in a given level may be generated with an algorithm that differs from an algorithm used to generate the placement solution for a different level. In this manner, the framework provides for a more robust and efficient VM placement given the available and user constraints. As new or additional constraints are imposed, the framework may be re-executed to generate a new solution (comprising a set of placement solutions for the levels).

The following provides a more detailed description of the various components of the virtual machine placement framework.

Figure 6:
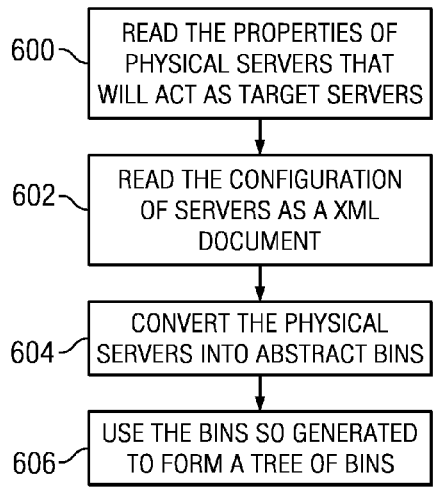
FIG. 6 illustrates a bin abstraction process flow implemented by the framework.

FIG. 6 illustrates a bin abstraction process. As described above, typically this process occurs off-line, namely, before the actual placement engine is executed to generate the placements. The routine begins at step 600 by reading the properties of the physical servers that will act as target servers. At step 602, the data center configuration is obtained. As noted above, preferably the data center configuration is expressed in a machine-readable format such as XML. The XML file defining this configuration is generated by the XML editor and, as an example, would describe the data center topology, one or more physical or operational characteristics associated therewith, and the like. Thus, a typical data center might be composed of one or more subnets, with each subnet composed of one or more racks, with each rack composed of one or more chasis that each supports one or more physical servers, and so forth. Each such data center element may have one or more attributes (e.g., bandwidth) associated therewith. An XML configuration file represents the data center elements in a machine-readable, hierarchical format.

Referring back to FIG. 6, at step 604, the bin abstractor (element 504 in FIG. 5) converts the physical servers into abstract bins. The routine then continues at step 606 to generate a hierarchical tree of bins (element 507 in FIG. 5), with each node of the tree representing a bin.

Figure 7:
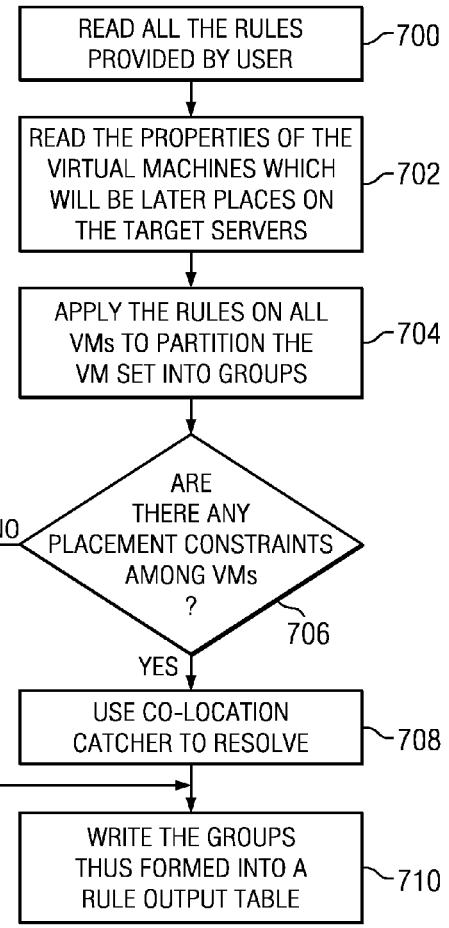
FIG. 7 illustrates a rules engine process flow implemented by the framework.

FIG. 7 illustrates the rules engine operation. The process begins at step 700 by reading (obtaining) a set of one or more rules. As noted above, a rule defines a constraint on a virtual machine (or a set of such machines). As has been described, the rules are provided by the user using the configurator. At step 702, the rule engine obtains the properties of the virtual machines that will be later placed onto the target servers. At step 704, the rules engine applies the rules on all virtual machines to partition the virtual machines into groups (or bundles). Typically, groups either are disjoint, or a particular group is entirely inside another group. The routine then continues at step 706 to test whether there are any placement constraints among virtual machines. In particular, given the applications that are executing in the data center, it may be desired or required that given virtual machines be bundled together to enforce one or more co-location constraints. If such constraints exist, the routine executes a co-location catcher routine (element 517, in FIG. 5) in step 708 to enforce a more fine-grained grouping on the virtual machines. If no such constraints exist, or following the operation in step 708, the rules engine writes the resulting groups into a rule output table. This is step 710, and the rule output table is shown as 513 (in FIG. 5). Preferably, these operations also occur off-line to the placement computation.

Figure 8:
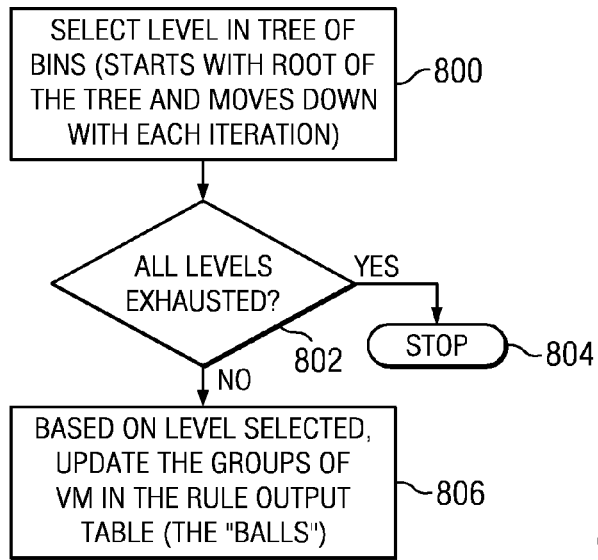
FIG. 8 illustrates a controller process flow implemented by the framework.

The co-location catcher module 517 groups virtual machines and makes an abstract "ball" out of them. A representative co-location rule might be "do not mix virtual machines of a first type with virtual machines of a second type." When parsed, normal rules produce only a single ball; in general, however, a co-location rule either generates two balls per rule or combines into a single ball two previously-generated balls. The controller operation (following bin abstraction and generation of the rule output table) is shown in FIG. 8. Processing begins at step 800 by selecting a level in the bin tree. Preferably, this operation begins with the root of the tree and moves downward (away from the root) with each iteration. At step 802, a test is performed to determine whether all levels of the tree have been exhausted. If so, the controller has finished the current placement. The routine then branches to step 804 and terminates. If, however, the result of the test at step 802 indicates that all levels are not yet processed, the routine continues at step 806. At this step, and based on the level selected, the groups of virtual machines in the rule output table 513 (in FIG. 5) are updated. In particular, if the rule output table is considered to be a database and the "level" selected a database query, the result of that query then corresponds to the "balls" that will be subjected to the bin packing problem solution for that level.

Figure 9:
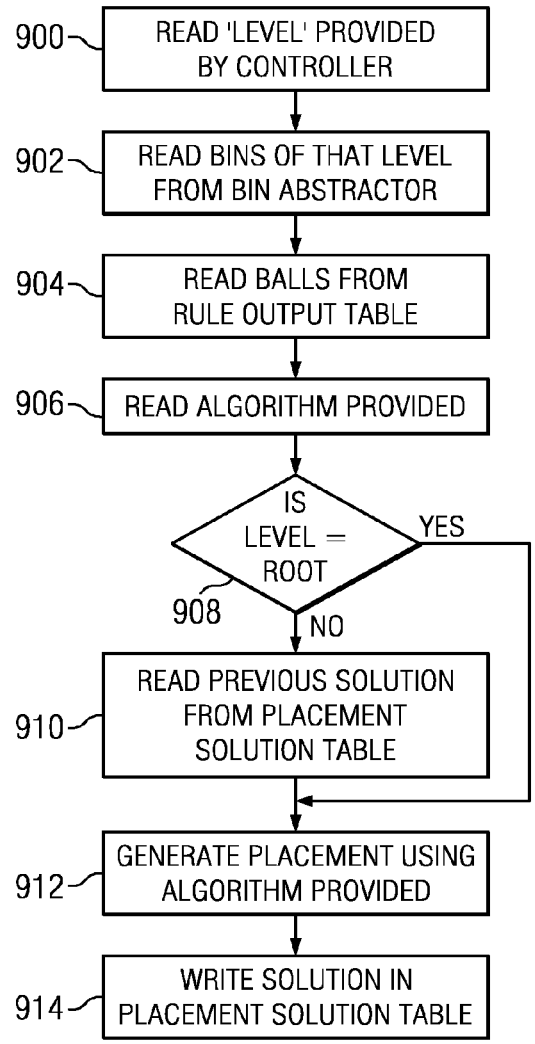
FIG. 9 illustrates a placement engine process flow implemented by the framework.

FIG. 9 illustrates the operation of the placement engine. At step 900, the placement engine reads the "level" provided by the controller. At step 902, the placement engine reads the "bins of that level from the bin abstractor. At step 904, the placement engine reads the "balls" from the rule output table. At step 906, the placement engine reads the algorithm provided by the algorithm selector. As used herein, "reads" may refer to the particular information being provided to the placement engine, and the particular ordering of the steps is not a limitation. At step 908, a test is performed to determine if the level is "root." If not, the routine branches to step 910 to read the previous solution (from the prior level) from the placement solution table 512 (in FIG. 5). If the level is root, or after step 910, the routine then continues at step 912 to generate the placement using the algorithm selected. At step 914, the placement engine writes the computed solution into the placement solution table. The process then returns to step 800 in FIG. 8.

Data Center Examples

Figure 10:
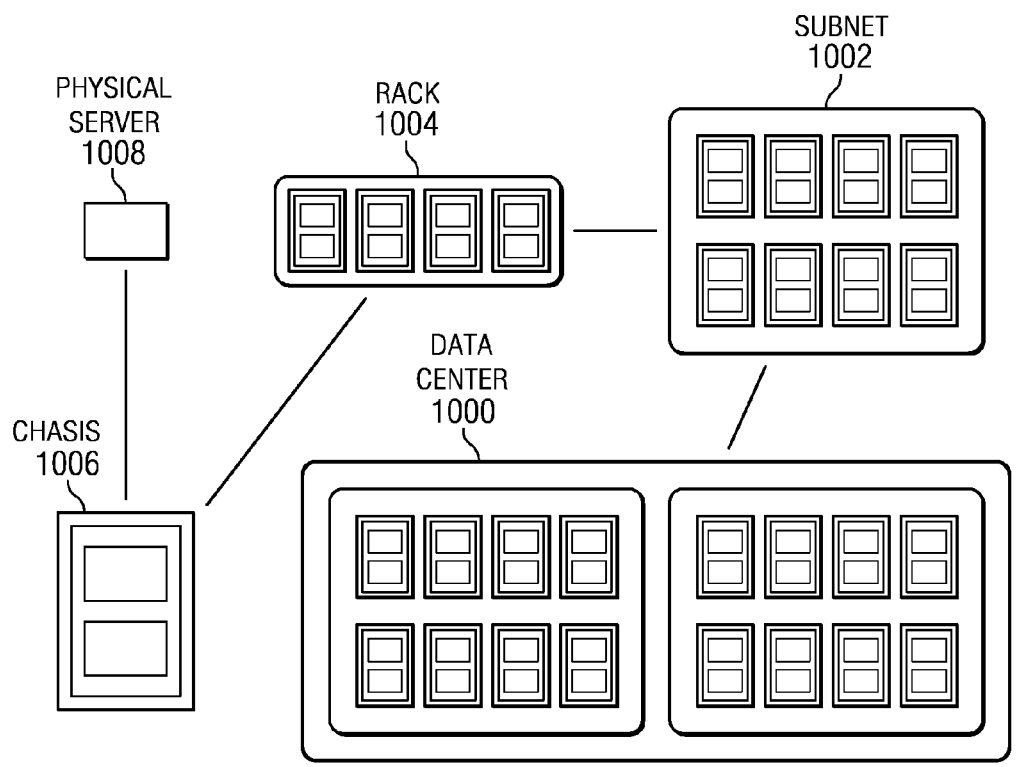
FIG. 10 illustrates a representative data center.

FIG. 10 illustrates a representative data center 1000 comprising one or more subnets 1002, wherein a subnet comprises one or more racks 1004, wherein a rack comprises one or more chasis 1006, wherein a chasis comprises one or more physical servers 1008, and so forth.

Figure 11:
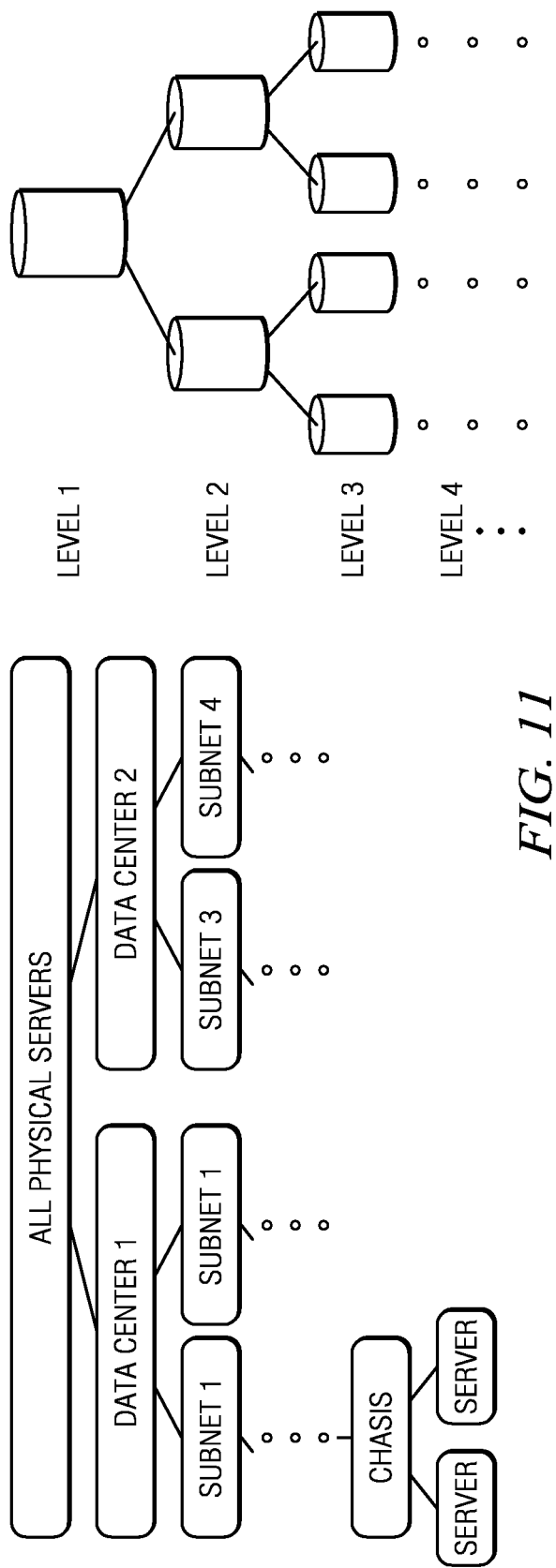
FIG. 11 illustrates how a set of physical servers used in an example data center facility are decomposed into a hierarchy of bins to facilitate processing by the framework.

FIG. 11 illustrates how a set of physical servers are decomposed into a hierarchy, which is then represented on the right by a hierarchy of bins. In this example, which is merely representative, there are a pair of data centers that are being managed. Thus, the first level (Level 1) represents the entire facility, the second level (Level 2) the data centers, the third level (Level 3) the subnets, and so forth.

Figure 12:
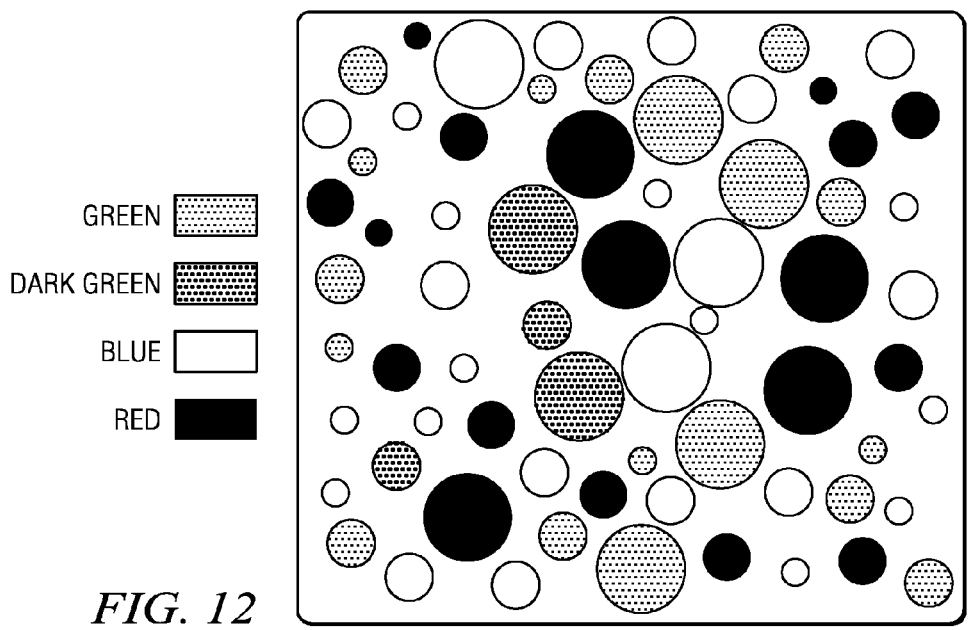
FIG. 12 illustrates a data set (or "bubble") that corresponds to the virtual machines that are available to be assigned in the example data center facility of FIG. 11.

FIG. 12 illustrates a data set (or "bubble") that corresponds to the virtual machines, with the various shading suggestive similarity according to some defined criteria. The overall size of the bubble is a function of the VM sizing.

Figures 13, 14:
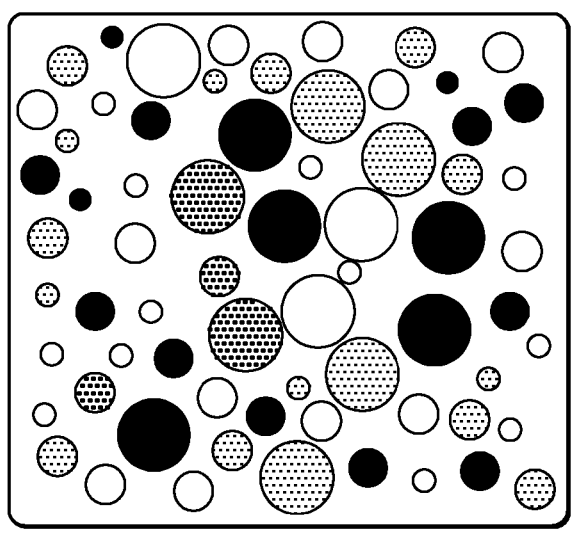
FIG. 13 illustrates several example rules of a rule set for use by the framework to perform the virtual machine placement according to this disclosure.
FIG. 14 illustrates the application of the first rule in the rule set of FIG. 13, wherein all VMs of the first type are placed in a single subnet.

FIG. 13 illustrates several example rules, which are merely representative. Rule 1, for example, provides a constraint that all VMs of a first type are to be placed in the same subnet. In this example scenario, this is a subnet level constraint. Rule 2, for example, provides a constraint that all VMs of a second type are to be placed in the same rack. In this example scenario, this is a rack level constraint. Rule 3, for example, provides a constraint that all VMs of a third type are to be placed in the same data center. This is a co-location constraint that would be processed by the co-location catcher as previously described. In this example scenario, this is a data center level constraint. Rule 4, for example, provides an additional data center constraint, namely, that VMs of the third and fourth types should not be mixed.

Figure 15:
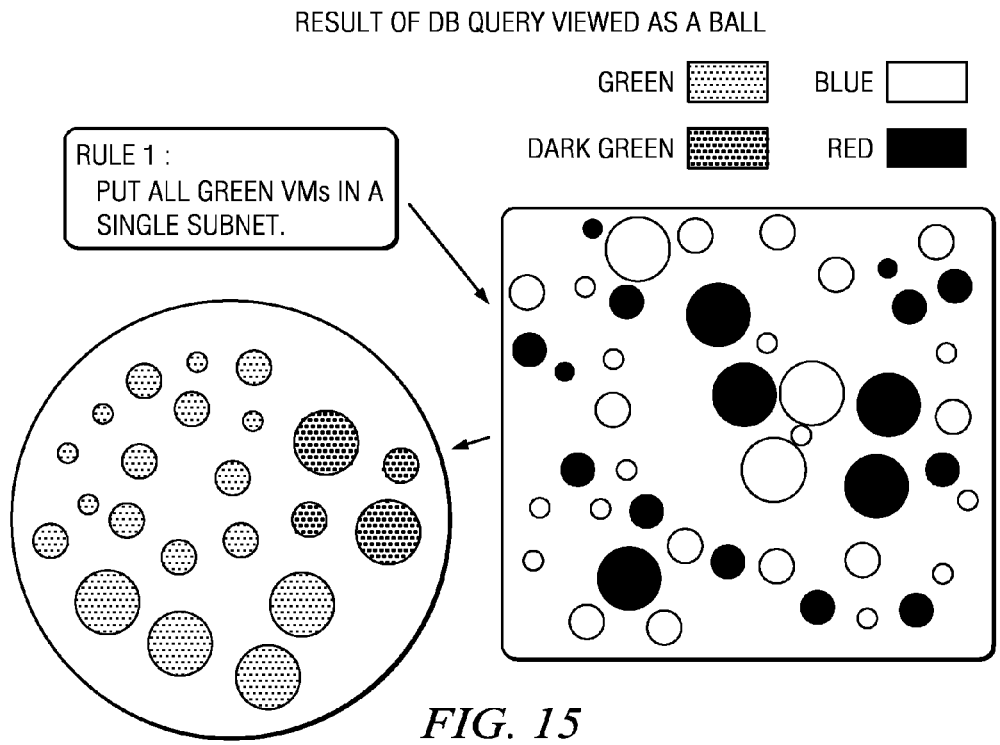
FIG. 15 illustrates the result of a database query ("put all VMs of the first type in a single subnet") viewed as a "ball" according to this disclosure.

FIG. 14 illustrates the application of Rule 1, wherein all VMs of the first type are placed in a single subnet. FIG. 15 illustrates the result of a database query ("put all VMs of the first type in a single subnet") viewed as a "ball." This is an output from the rule output table.

Figure 16:
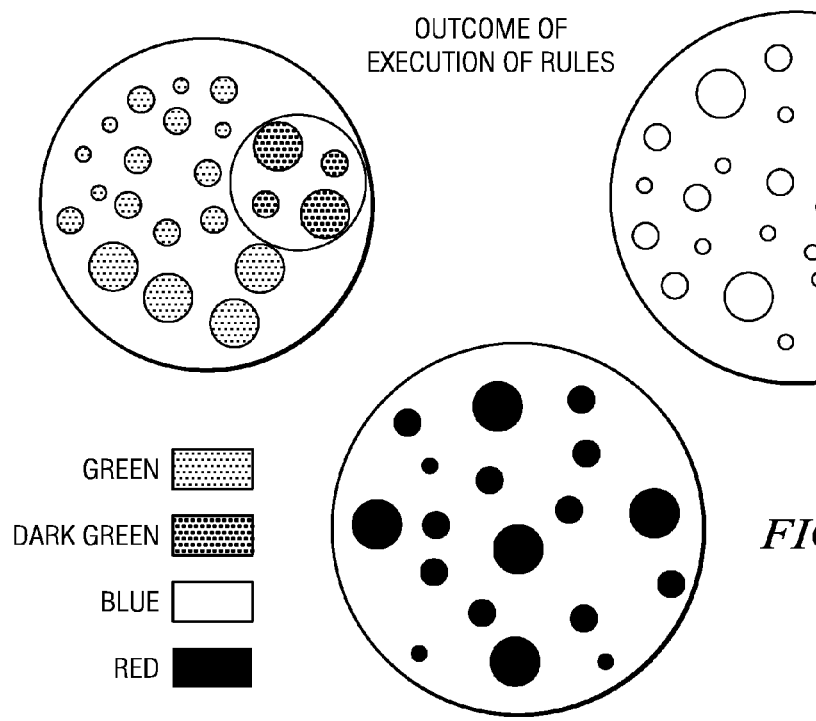
FIG. 16 illustrates the outcome of execution of all of the rules in the example scenario.

FIG. 16 illustrates the outcome of execution of all of the rules in the example scenario.

Figure 17:
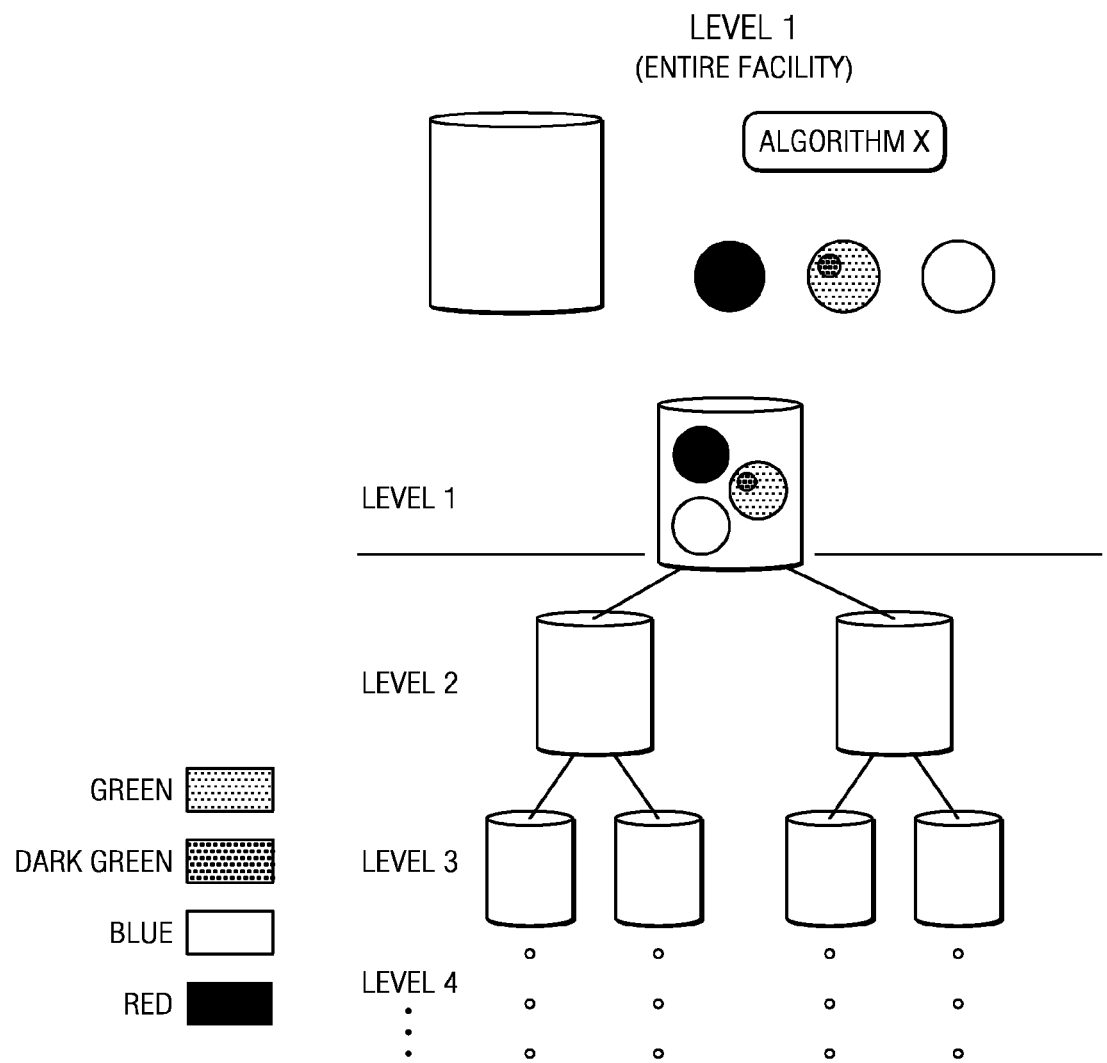
FIG. 17 illustrates the operation of the placement engine at the first level, which applies algorithm X to generate the placement solution for the entire facility.
Figure 18:
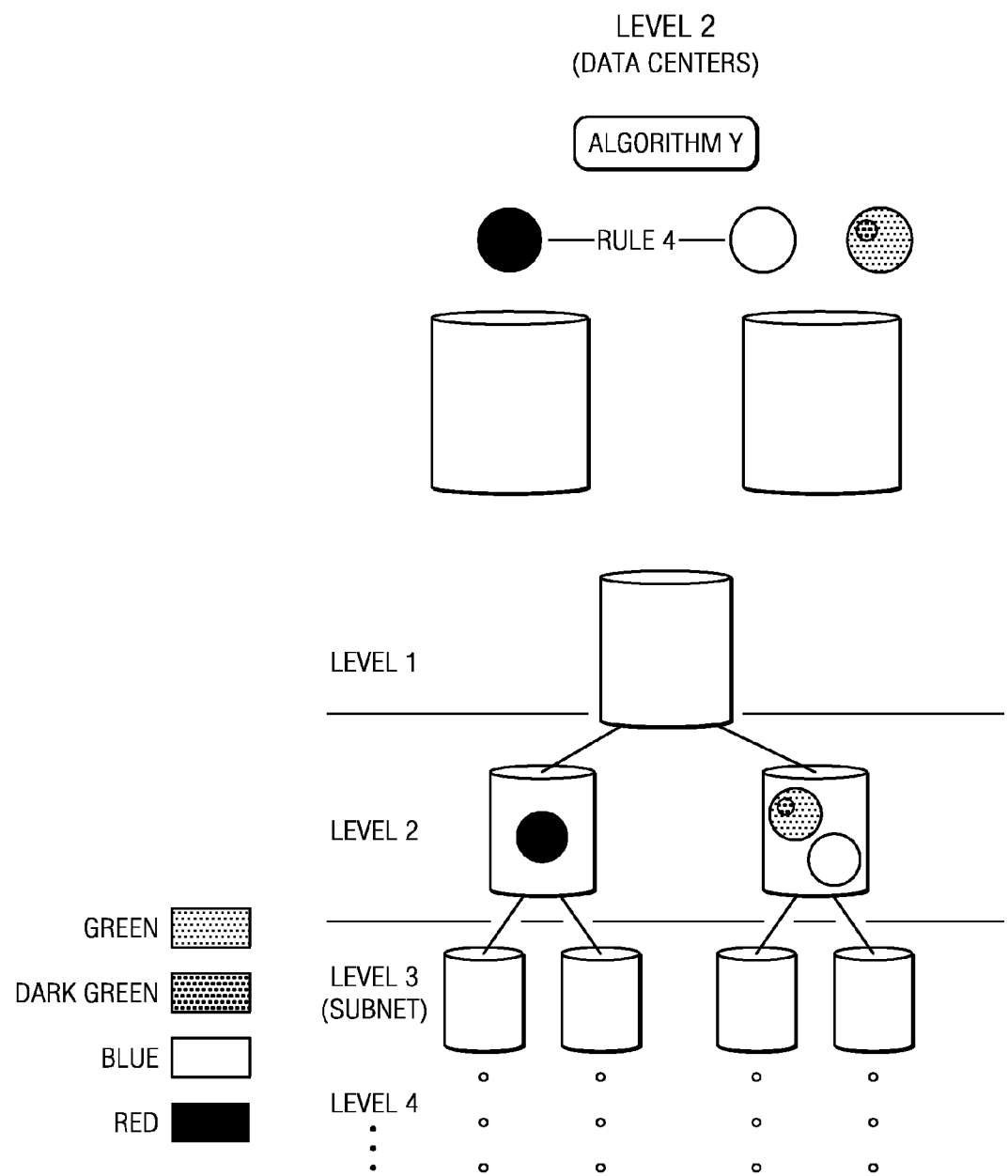
FIG. 18 illustrates the operation of the placement engine at the second level, which applies algorithm Y to generate the placement solution for the pair of data centers.
Figure 19:
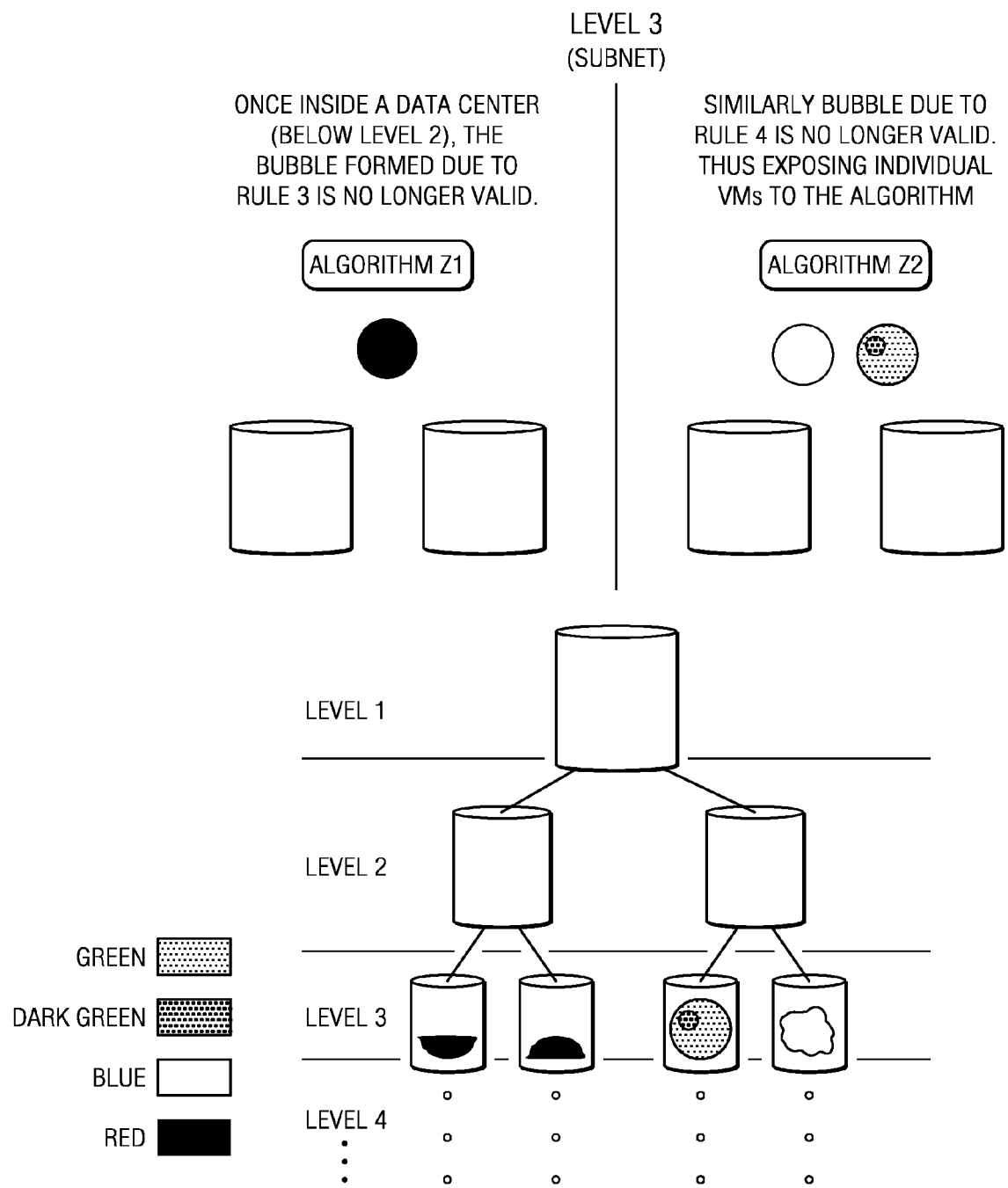
FIG. 19 illustrates the operation of the placement engine at the third level, which applies algorithm Z1 to a first subnet, and applies algorithm Z2 to a second subnet.
Figure 20:
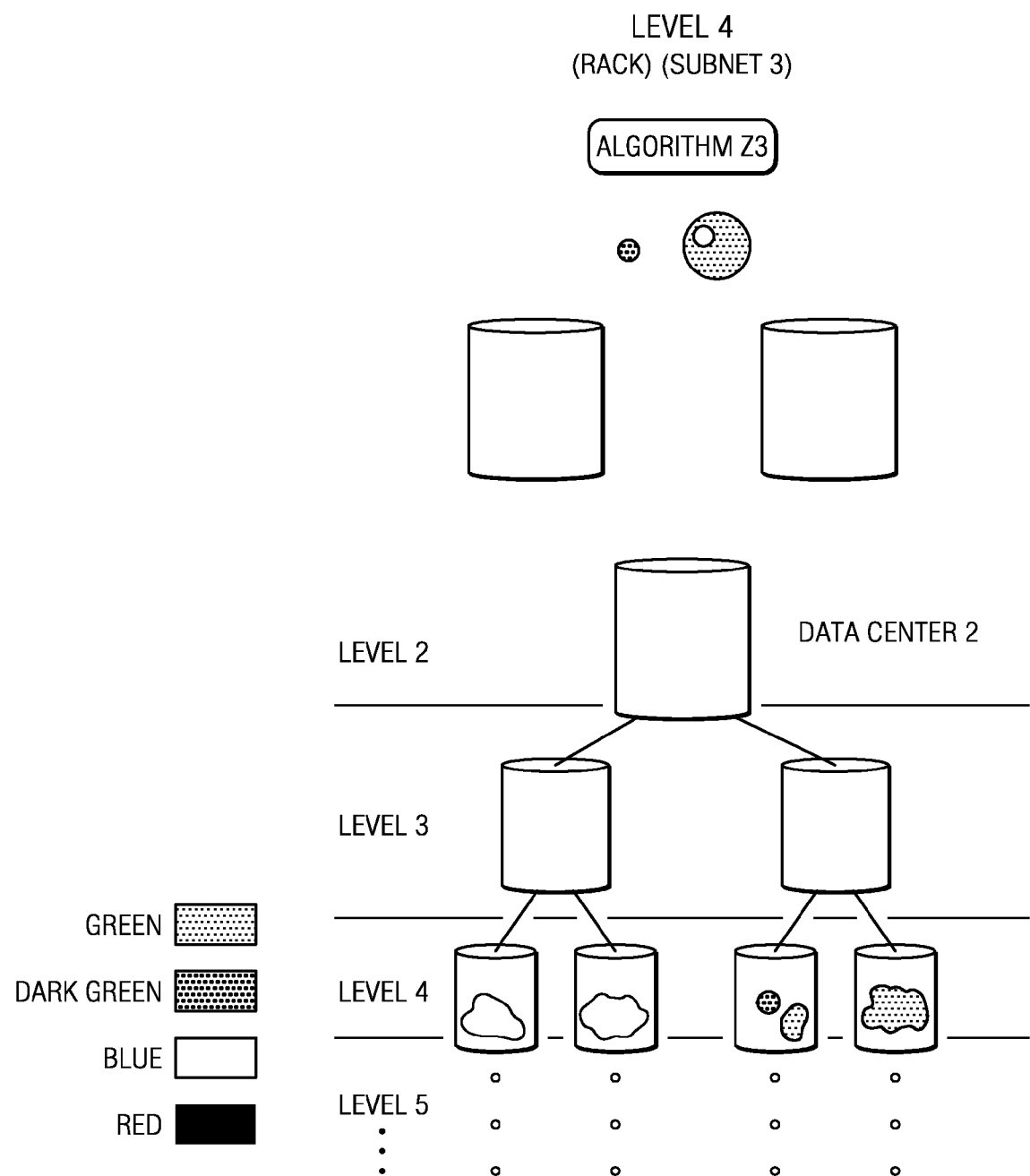
FIG. 20 illustrates the operation of the placement engine at the fourth level of the hierarchy.

FIG. 17 illustrates the operation of the placement engine at the first level, which is the root. The operation applies algorithm X to generate the placement solution for the entire facility. FIG. 18 illustrates the operation of the placement engine at the second level. The operation applies algorithm Y to generate the placement solution for the pair of data centers. FIG. 19 illustrates the operation of the placement engine at the third level. Once inside the data center (below Level 2 in this example), the operation applies algorithm Z1 to the left subnet, and algorithm Z2 to the right subnet. In the left subnet, the bubble formed due to Rule 3 is no longer valid; likewise, in the left subnet, the bubble due to Rule 4 is no longer valid, thus exposing individual VMs to the algorithm selected. FIG. 20 illustrates the operation of the placement engine at the fourth level, which is now within a chasis of a given rack within a given subnet of a given data center. The planning process iterates in this manner until complete.

The subject matter described herein has significant advantages over the prior art. The technique exploits a natural hierarchy in the data center to build a hierarchical tree that abstracts out the details of the data center physical entities (e.g., data center, subnet, rack, chasis, physical server, etc.) and enables the placement problem to be converted into a layered bin packing problem. The technique allows a user to define constraints in a simple rules-based format that can then be parsed to query a database. The rules are used to govern the virtual machine placement by placing constraints on the placement scheme. In this manner, the solution provides a unifying framework into which existing placement algorithms can be plugged with ease. At the same time, the framework ensures that all user constraints are addressed.

Moreover, the rules provide significant flexibility to users to govern VM placements. The approach reduces labor requirements significantly, as it is no longer necessary to develop and implement complex algorithms for each new constraint or constraint type. The approach is further advantageous as it enables re-use of existing technologies (e.g., placement algorithms), and it enables management of diverse constraints using off-the-shelf algorithms. The technique addresses how to combine multiple criteria and constraints to facilitate virtual machine placement, thereby increasing data center efficiencies and performance, while reducing administrative and management costs.

The virtual machine placement framework described herein is not limited to use with bin packing algorithms. More generally, the bin packing problem may be generalized as a container filling problem, such that any container filling algorithm (e.g., flow algorithms) may be used as well. Moreover, the word "bin" should not be taken to limit the disclosed framework, as this construct may be generalized as any type of abstract "container."

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The virtual machine planning framework or components thereof may be hosted in the cloud.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the virtual machine placement framework can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the framework components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the framework functionality provided herein may be implemented as an adjunct or extension to an existing cloud compute management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method of placing virtual machines, comprising:
representing physical entities upon which the virtual machines are to be placed as a hierarchical tree of bins;
receiving one or more virtual machine-to-physical entity constraints on a placement scheme for the virtual machines; and
using information derived from the hierarchical tree and the virtual machine-to-physical entity constraints to define, for each level of the hierarchical tree, a placement solution that associates given virtual machines to given physical entities by solving, within a computing machine having a hardware element, a bin packing problem, wherein the bin packing problem is solved at a given level of the hierarchical tree using a placement algorithm, together with a placement solution from a prior level.

2. The method as described in claim 1 wherein the bin packing problem is solved at each level of the hierarchical tree using virtual machine-to-physical entity constraints associated with that level and the placement algorithm.

3. The method as described in claim 2 wherein the virtual machine-to-physical entity constraints associated with a first level differ from the virtual machine-to-physical entity constraints associated with a second level.

4. The method as described in claim 2 wherein the placement algorithm used at a first level differs from the placement algorithm used at a second level.

5. The method as described in claim 1 wherein the virtual machine-to-physical entity constraints are defined in one or more user-defined rules.

6. The method as described in claim 1 wherein the using step further comprises:
applying the virtual machine-to-physical entity constraints to a set of virtual machines to partition the set of virtual machines into a set of virtual machine groupings;
for each level in the hierarchical tree, beginning with a first level and continuing until all levels in the hierarchy have been processed:
generating from the set of virtual machine groupings one or more entities;
applying the placement algorithm to the one or more entities to compute the placement solution that associates given virtual machines to given physical entities.

7. The method as described in claim 1 wherein the hierarchical tree is defined as an XML document that models a facility as a tree of physical entities and attributes associated therewith.

8. Apparatus, comprising:
a processor;
computer memory holding computer program instructions executed by the processor to place virtual machines, the computer program instructions comprising:
program code to represent physical entities upon which the virtual machines are to be placed as a hierarchical tree of bins;
program code to receive one or more virtual machine-to-physical entity constraints on a placement scheme for the virtual machines; and
program code to use information derived from the hierarchical tree and the virtual machine-to-physical entity constraints to define, for each level of the hierarchical tree, a placement solution that associates given virtual machines to given physical entities by solving a bin packing problem, wherein the bin packing problem is solved at a given level of the hierarchical tree using a placement algorithm, together with a placement solution from a prior level.

9. The apparatus as described in claim 8 wherein the bin packing problem is solved at each level of the hierarchical tree using virtual machine-to-physical entity constraints associated with that level and the placement algorithm.

10. The apparatus as described in claim 9 wherein the virtual machine-to-physical entity constraints associated with a first level differ from the virtual machine-to-physical entity constraints associated with a second level.

11. The apparatus as described in claim 9 wherein the placement algorithm used at a first level differs from the placement algorithm used at a second level.

12. The apparatus as described in claim 8 wherein the virtual machine-to-physical entity constraints are defined in one or more user-defined rules.

13. The apparatus as described in claim 8 wherein the program code to use further comprises:
program code to apply the virtual machine-to-physical entity constraints to a set of virtual machines to partition the set of virtual machines into a set of virtual machine groupings;
for each level in the hierarchical tree, beginning with a first level and continuing until all levels in the hierarchy have been processed:
program code to generate from the set of virtual machine groupings one or more entities;
program code to apply the placement algorithm to the one or more entities to compute the placement solution that associates given virtual machines to given physical entities.

14. The apparatus as described in claim 8 wherein the hierarchical tree is defined as an XML document that models a facility as a tree of physical entities and attributes associated therewith.

15. A computer program product in a non-transitory computer readable storage medium for use in a data processing system, the computer program product holding computer program instructions which, when executed by the data processing system, perform a method of placing virtual machines, the method comprising:
representing physical entities upon which the virtual machines are to be placed as a hierarchical tree of bins;
receiving one or more virtual machine-to-physical entity constraints on a placement scheme for the virtual machines; and
using information derived from the hierarchical tree and the virtual machine-to-physical entity constraints to define, for each level of the hierarchical tree, a placement solution that associates given virtual machines to given physical entities by solving a bin packing problem, wherein the bin packing problem is solved at a given level of the hierarchical tree using a placement algorithm, together with a placement solution from a prior level.

16. The computer program product as described in claim 15 wherein the bin packing problem is solved at each level of the hierarchical tree using virtual machine-to-physical entity constraints associated with that level and the placement algorithm.

17. The computer program product as described in claim 16 wherein the virtual machine-to-physical entity constraints associated with a first level differ from the virtual machine-to-physical entity constraints associated with a second level.

18. The computer program product as described in claim 16 wherein the placement algorithm used at a first level differs from the placement algorithm used at a second level.

19. The computer program product as described in claim 15 wherein the virtual machine-to-physical entity constraints are defined in one or more user-defined rules.

20. The computer program product as described in claim 15 wherein the using step further comprises:
applying the virtual machine-to-physical entity constraints to a set of virtual machines to partition the set of virtual machines into a set of virtual machine groupings;
for each level in the hierarchical tree, beginning with a first level and continuing until all levels in the hierarchy have been processed:
generating from the set of virtual machine groupings one or more entities;
applying the placement algorithm to the one or more entities to compute the placement solution that associates given virtual machines to given physical entities.

21. The computer program product as described in claim 5 wherein the hierarchical tree is defined as an XML document that models a facility as a tree of physical entities and attributes associated therewith.

22. A virtual machine placement framework, comprising:
a processor;
a configuration tool executed on the processor to generate first data and second data, the first data representing, as a hierarchical tree of data containers, physical entities upon which the virtual machines are to be placed, the second data representing virtual machine-to-physical entity constraints on a placement scheme for the virtual machines; and
a placement engine executed on the processor to receive information derived from the first data and the second data, the placement engine executing one or more placement algorithms to generate a placement solution of virtual machines with respect to the physical entities;
the one or more placement algorithms including a first placement algorithm that is executed at a first level of the hierarchical tree to generate a first placement solution that associates given first virtual machines to given first physical entities, and a second placement algorithm that is executed at a second level of the hierarchical tree to generate a second placement solution that associates given second virtual machines to given second physical entities, the second placement algorithm also using the first placement solution to generate the second placement solution.

23. The virtual machine placement framework as described in claim 22 further including an algorithm selector executed on the processor to select the placement algorithm for use at a given level of the hierarchical tree.

24. The virtual machine placement framework as described in claim 23 wherein the configuration tool includes a rules editor to generate the second data using a rules framework.

* * * * *